J. W. BATCHELLER.
Improvement in Belt Tighteners.

No. 122,932.

Patented Jan. 23, 1872.

Witnesses:
John Becker
Francis McArdle

Inventor:
J. W. Batcheller
per Munn & Co.
Attorneys.

UNITED STATES PATENT OFFICE.

JOSIAH W. BATCHELLER, OF OREGON, MISSOURI.

IMPROVEMENT IN BELT-TIGHTENERS.

Specification forming part of Letters Patent No. 122,932, dated January 23, 1872.

Specification describing a new and Improved Belt-Tightener, invented by JOSIAH W. BATCHELLER, of Oregon, in the county of Holt and State of Missouri.

My invention consists of a tightening pulley mounted in the end of a bar, which is fitted in a plate for holding it so that it can be adjusted forward and backward, and the plate is arranged to be fastened to any suitable support to hold the tightening-pulley in front of the belt. The invention is more particularly adapted for sewing-machines, and the holding-plate is in this example arranged to be attached to the under side of a sewing-machine table.

Figure 1:
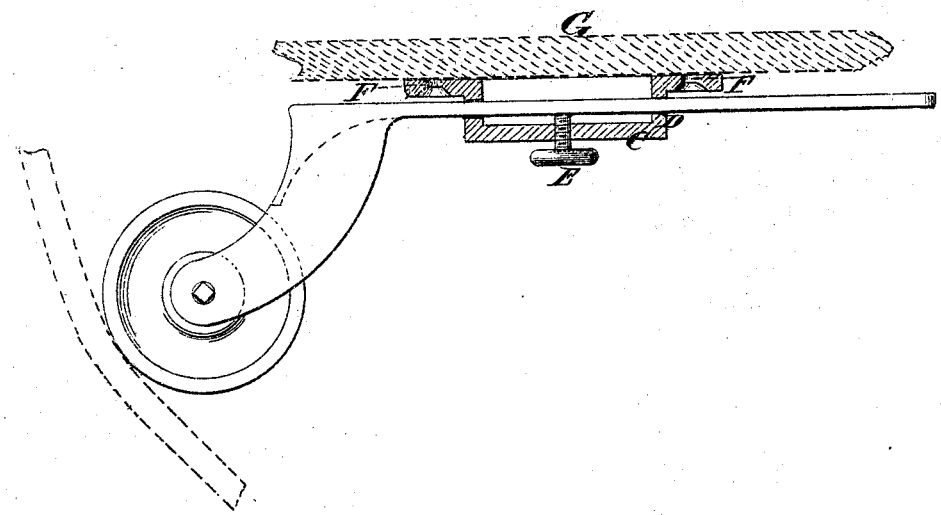
Figure 2:
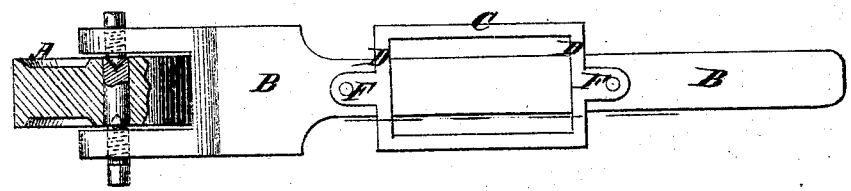

Figure 1 is a side elevation of the tightening-wheel and the adjusting-bar, and section of the fastening-plate and part of a table of a sewing-machine, and Fig. 2 is a horizontal section of the wheel and plan of the adjusting bar and fastening-plate.

Similar letters of reference indicate corresponding parts.

A is the belt-tightener wheel, B the adjusting-bar in which it is mounted, and C is the fastening-plate. The said adjusting-bar is crotched at one end and the wheel is pivoted in the crotch, and behind the crotch said bar is made with parallel sides and passes through holes in parts D of the fastening-plate, which are arranged perpendicular to the main portion of the plate for the purpose, and is held in any required position in said plate by a binding-screw, E. The ends F of the plate C are adapted to be fastened to the under side of the sewing-machine table G or other support by screws or any equivalent thereof. This tightening apparatus may be made of any capacity for any kind of machinery, the plate C being arranged in the part for attaching to the support, as may be required by the nature of the case.

Having thus described my invention, I claim as new, and desire to secure by Letters Patent—

A belt-tightening apparatus, consisting of the wheel A, adjusting bar B, supporting-plate C, and binding-screw E, the adjusting-bar and holding-plate being arranged and combined substantially as specified.

JOSIAH W. BATCHELLER.

Witnesses:
ALBERT ROECKER,
S. J. MORRISON.